United States Patent
Zimmer et al.

(10) Patent No.: US 9,026,773 B2
(45) Date of Patent: May 5, 2015

(54) PROVIDING A SECURE EXECUTION MODE IN A PRE-BOOT ENVIRONMENT

(75) Inventors: Vincent J. Zimmer, Federal Way, WA (US); Bryant Bigbee, Scottsdale, AZ (US); Andrew J. Fish, Olympia, WA (US); Mark S. Doran, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 13/135,358

(22) Filed: Jul. 1, 2011

(65) Prior Publication Data

US 2011/0271090 A1 Nov. 3, 2011

Related U.S. Application Data

(63) Continuation of application No. 10/306,570, filed on Nov. 27, 2002, now Pat. No. 7,974,416.

(51) Int. Cl.
*G06F 9/06* (2006.01)
*G06F 21/57* (2013.01)
*G06F 9/44* (2006.01)

(52) U.S. Cl.
CPC .............. *G06F 21/57* (2013.01); *G06F 9/4401* (2013.01); *G06F 9/4406* (2013.01); *G06F 9/4416* (2013.01); *G06F 21/575* (2013.01)

(58) Field of Classification Search
CPC .... G06F 9/4401; G06F 9/4406; G06F 9/4416
USPC ........ 713/151, 159, 193, 194, 2; 380/44, 277, 380/281; 726/2, 9
See application file for complete search history.

(56) References Cited

U.S. PATENT DOCUMENTS

| | | |
|---|---|---|
| 5,444,850 A | 8/1995 | Chang |
| 5,537,540 A | 7/1996 | Miller |
| 5,555,373 A | 9/1996 | Dayan |
| 5,680,547 A | 10/1997 | Chang |
| 5,887,131 A | 3/1999 | Angelo |
| 5,937,063 A | 8/1999 | Davis |
| 5,949,882 A | 9/1999 | Angelo |
| 5,960,084 A | 9/1999 | Angelo |
| 6,038,667 A * | 3/2000 | Helbig, Sr. ................ 726/16 |
| 6,115,819 A | 9/2000 | Anderson |
| 6,151,696 A | 11/2000 | Miller |

(Continued)

FOREIGN PATENT DOCUMENTS

| | | |
|---|---|---|
| EP | 0848315 | 6/1998 |
| EP | 0458626 | 3/1999 |
| EP | 1085396 | 3/2001 |

OTHER PUBLICATIONS

TCPA PC Specific Implementation Specification, Version 1.00, Sep. 9, 2001.*

(Continued)

*Primary Examiner* — Saleh Najjar
*Assistant Examiner* — Peiliang Pan
(74) *Attorney, Agent, or Firm* — Trop, Pruner & Hu, P.C.

(57) ABSTRACT

In one embodiment, the present invention includes a method to establish a secure pre-boot environment in a computer system; and perform at least one secure operation in the secure environment. In one embodiment, the secure operation may be storage of a secret in the secure pre-boot environment.

23 Claims, 4 Drawing Sheets

(56) References Cited

U.S. PATENT DOCUMENTS

| | | |
|---|---|---|
| 6,272,629 B1 | 8/2001 | Stewart |
| 6,314,520 B1 | 11/2001 | Schell |
| 6,327,660 B1 | 12/2001 | Patel |
| 6,370,599 B1 * | 4/2002 | Anand et al. ............. 710/15 |
| 6,372,629 B1 | 4/2002 | Lowrey |
| 6,401,202 B1 | 6/2002 | Abgrall |
| 6,430,707 B1 | 8/2002 | Matthews |
| 6,446,153 B2 | 9/2002 | Cooper |
| 6,477,648 B1 | 11/2002 | Schell |
| 6,560,702 B1 | 5/2003 | Gharda |
| 6,564,318 B1 | 5/2003 | Gharda |
| 6,581,162 B1 * | 6/2003 | Angelo et al. ............ 713/193 |
| 6,711,688 B1 | 3/2004 | Hubacher |
| 6,715,043 B1 | 3/2004 | Stevens |
| 6,735,696 B1 * | 5/2004 | Hannah ................... 713/189 |
| 6,763,454 B2 | 7/2004 | Wilson |
| 6,823,464 B2 | 11/2004 | Cromer |
| 6,904,523 B2 | 6/2005 | Bialick |
| 6,928,541 B2 | 8/2005 | Sekiguchi |
| 6,948,098 B2 | 9/2005 | Pillay |
| 6,957,335 B2 | 10/2005 | Foster et al. |
| 6,988,250 B1 | 1/2006 | Proudler |
| 7,000,249 B2 | 2/2006 | Lee |
| 7,055,029 B2 | 5/2006 | Collins et al. |
| 7,085,921 B2 | 8/2006 | Frye, Jr. |
| 7,103,529 B2 | 9/2006 | Zimmer |
| 7,117,172 B1 | 10/2006 | Black |
| 7,130,977 B1 * | 10/2006 | Christie et al. ............ 711/163 |
| 7,174,463 B2 | 2/2007 | Cromer |
| 7,191,464 B2 | 3/2007 | Cromer |
| 7,200,761 B1 | 4/2007 | Freeman |
| 7,210,167 B2 | 4/2007 | Brezak |
| 7,216,251 B2 | 5/2007 | Gaunt |
| 7,490,250 B2 | 2/2009 | Cromer |
| 7,558,958 B2 | 7/2009 | Lieberman |
| 7,779,267 B2 * | 8/2010 | Chen et al. ............... 713/185 |
| 7,797,423 B2 | 9/2010 | Holden |
| 7,797,729 B2 | 9/2010 | Lee |
| 7,877,799 B2 | 1/2011 | Proudler |
| 2002/0073316 A1 * | 6/2002 | Collins et al. ............ 713/174 |
| 2003/0041250 A1 | 2/2003 | Proudler |
| 2003/0115443 A1 | 6/2003 | Cepulis |
| 2003/0159047 A1 * | 8/2003 | Smeets et al. ............ 713/176 |
| 2003/0191943 A1 * | 10/2003 | Poisner et al. ............ 713/181 |
| 2004/0081104 A1 | 4/2004 | Pan |
| 2004/0088559 A1 * | 5/2004 | Foster et al. ............. 713/193 |
| 2005/0081071 A1 | 4/2005 | Huang |

OTHER PUBLICATIONS

German Patent Office, Examination Report (including translation) for DE Application No. 10393662.9-53 dated Jul. 19, 2010 (11 pages).

Compaq Computer Corporation, Hewlett-Packard Company, IBM Corporation, Intel Corporation, Microsoft Corporation, "TCPA PC Specific Implementation Specification," Version 1.0, Sep. 9, 2001.

* cited by examiner

PROVIDING A SECURE EXECUTION MODE IN A PRE-BOOT ENVIRONMENT

CROSS-REFERENCE TO RELATED APPLICATIONS

This application is a continuation of U.S. patent application Ser. No. 10/306,570, filed on Nov. 27, 2002.

BACKGROUND

The present invention relates to operation of a computer system, and more particularly to operation of such a system in a pre-boot environment.

When a computer system is turned on, it cannot perform functions desired by a user until it is initialized and is able to communicate with the user. This initialization process generally includes a booting procedure, typically performed by boot-up firmware. The boot-up firmware may be an operating system ("OS"), a portion of the OS, the Basic Input/Output System ("BIOS"), or other software.

The boot-up firmware is typically stored in some form of non-volatile memory and allows a central processing unit ("CPU") to perform tasks such as initialization, diagnostics, loading the operating system kernel from mass storage, and routine input/output ("I/O") functions. The boot-up firmware may be stored in erasable programmable read only memory ("EPROM") or flash semiconductor memory.

In this pre-boot environment, typically few or no security measures are available (all code runs in primitive, ring0 physical mode), nor is there an ability to store a secret in the pre-boot environment. Further, when the OS environment is entered from the pre-boot environment, there is no ability to establish a so-called root of trust from the pre-boot environment to the OS environment. Such a root of trust may be desirable for a Trusted Computing Platform (TCP) in accordance with the Trusted Computing Platform Alliance (TCPA) Main Specification Version 1.16, published Feb. 22, 2002, to provide reliable information about itself and its current software processes, and provide attestation to operation of its software processes.

DETAILED DESCRIPTION

In one embodiment, the present invention may be used to establish a secure pre-boot execution environment of a computer system. As used herein, the term "computer system" may refer to any type of processor-based system, such as a desktop computer, a laptop computer, a server computer, an appliance or set-top box, or the like. In certain embodiments, the computer system may include a so-called Intel Architecture (IA) processor, such as an IA32 processor, available from Intel Corporation, Santa Clara, Calif. However, it is to be understood that in other embodiments, the present invention may be used in connection with other CPU microarchitectures presently known or arising in the future.

In one embodiment, the secure pre-boot execution environment may be implemented in firmware conformant to the Extensible Firmware Interface (EFI) Specification, version 1.02, published Dec. 12, 2000 by Intel Corporation, Santa Clara, Calif.

A secure pre-boot execution environment of a computer system in accordance with one embodiment may be used to perform secure operations, for example, secret storage and subsequent access to the secret; this is also known as secure or isolated storage. As used herein, "secret" means any information (whether data, instruction or other) that is kept hidden from the computer system and user when not in the secure pre-boot environment. For example, such secrets may include keys, passwords, financial information, medical records and the like. Also, the secure pre-boot mode may be used for isolated execution. This provides a means to segregate untrusted, errant or malicious code (collectively "harmful code") from other trusted, verifiable code.

Figure 1:
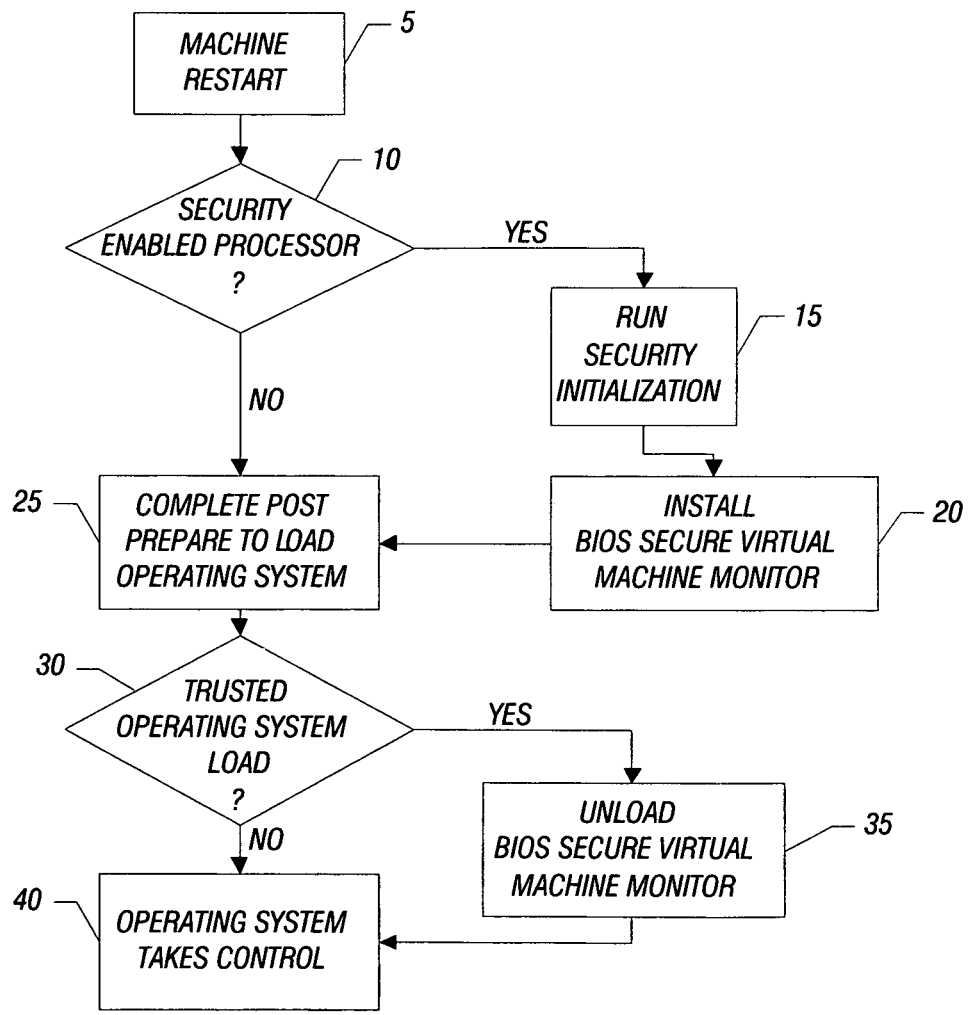
FIG. 1 is a flow diagram of an example program flow in accordance with one embodiment of the present invention.

FIG. 1 is a flow diagram of an example program flow in accordance with one embodiment of the present invention. As shown in FIG. 1, upon restart of a computer system (block 5), firmware determines whether a CPU has the ability to accommodate secure pre-boot mode operation, that is, whether the CPU is security enabled (diamond 10). If such a CPU is present, security initialization software may be run (block 15). Next, BIOS Secure Virtual Machine Monitor (SVMM) may be installed (block 20) and a SVMM pre-boot environment may be entered. As used herein, the term "Secure Virtual Machine Monitor" or "SVMM" means a secure environment in which one or more operating environments exist on a single platform. While in the SVMM, any desired secure operations, such as secret storage/access, flash memory updates, and the like, may be performed.

It is to be understood that a "Virtual Machine" is not required; rather, the software may be a Secure Monitor, where the "Monitor" aspect speaks to the ability to detect and qualify access of untrusted code. In certain embodiments, the SVMM may form a Trusted Computing Base (TCB); a TCB is a small, verified subset of code that can be isolated from and control behavior of the rest of the code. A TCB may be designed to be small in order to have a formal, third party review of the security and safety attributes.

Next, or if a secure mode processor is not available, power on self test (POST) may be completed and the pre-boot environment is prepared to load the OS (block 25). It is determined then whether a trusted OS load is possible (diamond 30). If such a load is possible, the BIOS SVMM is unloaded (block 35). Either way, the OS may then take control of the computer system (block 40).

It is to be understood that the early invocation of a secure CPU operational mode is not limited to a Virtual Machine Monitor (VMM) design such as the SVMM, but may be used in connection with other CPU security modes.

Figure 2:
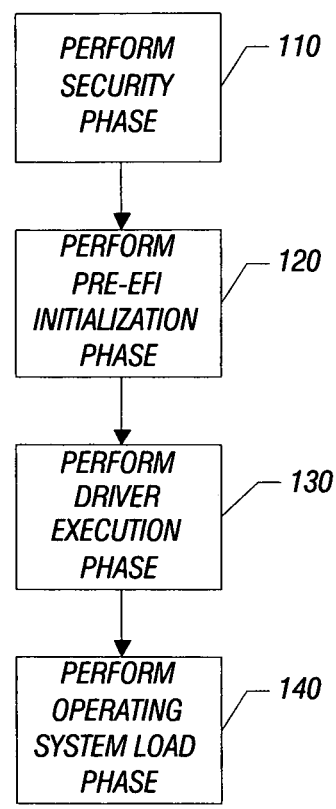
FIG. 2 is a flow diagram of example firmware operation in accordance with one embodiment of the present invention.

In one embodiment, firmware may perform pre-boot operations in a series of phases. FIG. 2 is a flow diagram of example firmware operation in accordance with one embodiment of the present invention. As shown in FIG. 2, upon machine start or restart, a security phase may be performed (block 110). In the security phase, initial operations after platform reset or power on may be performed to ensure that firmware integrity is intact. Next, a pre-EFI (PEI) initialization phase may be performed (block 120). In the PEI phase, code may perform minimal processor chipset and platform configuration to support memory discovery.

Next, a driver execution (DXE) phase may be performed (block 130). It is in this phase that a majority of the firmware code may operate in the pre-boot environment. In one embodiment, the code may be implemented as a number of drivers, which complete initialization of the platform and devices. Finally, an operating system load phase may be performed (block 140). In this phase, the operating system is loaded and at the conclusion of this phase the operating system takes control of the platform.

In one embodiment, the firmware may launch a Virtual Machine Monitor (VMM) driver. This driver may publish an instance of the VMM protocol. In certain embodiments, the driver may be launched early in the DXE phase and may perform a SENTER command to access a secure environment launch.

In one embodiment, the VMM driver may materialize a SVMM, which in certain embodiments may have scalable capabilities. The scalability stems from the ability of the VMM driver to allow loading of subsequent drivers into a secure execution mode (referred to herein as "virtual machine extensions" or "VMX"). In certain embodiments, the SVMM may execute in a highest privilege level (e.g., Ring0P in an IA32 processing system). Any subsequently loaded drivers may execute in a lower privilege level (e.g., Ring3P in an IA32 processing system). Further, any other code designed to run in the secure pre-boot environment, such as guest-hosted system management mode (SMM) drivers and the like, may also execute in Ring 3P.

In various embodiments, these subsequent drivers may be launched via an authenticated driver load mechanism to ensure that only trusted drivers are loaded into the secure pre-boot environment managed by the SVMM. In one such embodiment, the authentication process may include use of a public key infrastructure (PKI) to ensure that only trusted drivers are loaded into the VMX environment. Alternately, core root-of-trust maintenance may be used to launch the SVMM, including but not limited to a transitive trust hand-off from a reset vector to the security phase to the PEI phase and into the DXE phase, as described above.

The SVMM driver that publishes the VMM protocol may have several roles in certain embodiments. First, it may be the first agent on a platform to issue the SENTER command, thus it may also become responsible for receiving subsequent system management interrupt (SMI) activations. In certain embodiments, for example, legacy operating systems, this role may be maintained during OS runtime, whereas in other embodiments (e.g., EFI-aware OS's) this role may be transitioned to an operating system-provided SVMM.

In certain embodiments, the SVMM may load additional VMX drivers. These drivers may be code sequences that desire to take advantage of the isolated storage and execution attributes of VMX; these drivers may include a BIOS integrity services driver available from Intel Corporation; authentication services, such as Kerberos available from Massachusetts Institute of Technology, Cambridge, Mass.; or other security code, such as pre-boot implementations of cryptographic algorithms, such as agents that perform asymmetric cryptographic computations, for example Rivest Shamir Adleman (RSA) available from RSA Security, Bedford, Mass. The point of isolating the aforementioned code is that the integrity of the code (i.e., not having been tampered with) is desired to satisfy the security assertions of the driver behavior.

Figure 3:
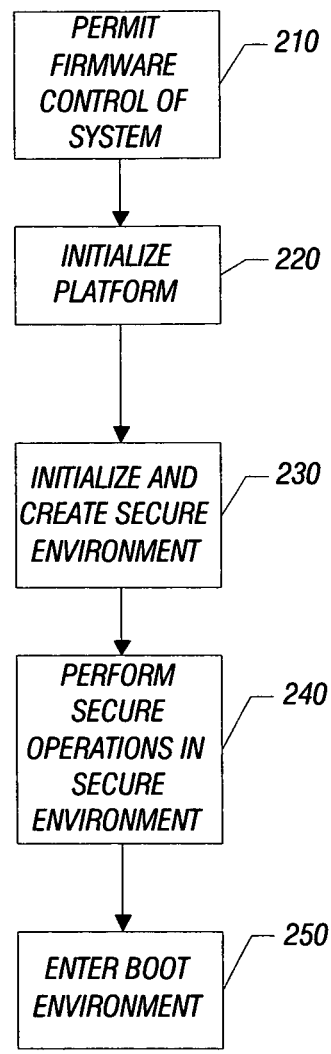
FIG. 3 is a flow diagram of operation of a pre-boot environment in accordance with one embodiment of the present invention.

Referring now to FIG. 3, shown is a flow diagram of operation of a pre-boot environment in accordance with one embodiment of the present invention. As shown in FIG. 3, firmware is provided control of the system (block 210). Such control may occur upon power up, via a system state (e.g. S3 sleep state) event or otherwise. Next, the platform may be initialized (block 220). In certain embodiments, such initialization may include minimal configuration of the processor, chipset and memory.

Next, as shown in FIG. 3, a secure environment may be initialized and created (block 230). Such initialization may include obtaining the secure code from a persistent memory device. In one embodiment, the secure code may be stored in a flash memory device that is permanently secured to a motherboard of the system. Because this code is stored in a persistent memory device and is known as a secure device, the pre-boot environment has a level of integrity. Furthermore, in one embodiment the initialization may include performing code in the chipset to ensure that the chipset is in a permissible state for secure pre-boot operation. In one embodiment, the secure initialization may be accomplished by performing a load SINIT command.

Creating the secure environment, in one embodiment, may include generating a digest in a fixed token (discussed further below) which provides information about the platform in the secure environment. Furthermore, creating the secure environment may include setting up a memory stack. In one embodiment, the secure environment may be created by loading a SVMM, as discussed above.

Next, secure operations may be performed in the pre-boot environment (block 240). As discussed herein, such operations may include sealing and unsealing of secrets using a fixed token, for example. Another use of the secure environment may be to update the flash memory. Further, such operations may include performance of secure or trusted drivers and attestation logs/signatures. Such attestation of signatures may be handed off to a challenger, for example.

When desired operations in the pre-boot environment have been performed, the boot environment may be entered (block 250). In one embodiment, a transitive handoff from the secure pre-boot environment to a trusted OS environment may be provided. In other embodiments, the secure pre-boot environment may be torn down prior to OS launch. Alternately, in other embodiments a boot environment may be entered with the secure mode maintained in the background for performing or maintaining platform integrity, for example. While discussed in reference to a single processor, in other embodiments a multiple processor environment (logical or real) may be present.

In one embodiment, the secure pre-boot environment may maintain a secret, which then may be used by platform firmware. On a first launch, the secure pre-boot environment may generate such a secret in the form of a root key, suitable to algorithms and protocols supported by the secure pre-boot environment. Once generated, this root key may be protected so that the protected root key will only be released to the same secure pre-boot environment running on the same platform.

This protection may be accomplished by use of a Trusted Computing Platform (TCP) (or an equivalent hardware "safe") in certain embodiments. In one embodiment, the secure pre-boot environment's root key may be sealed using fixed token facilities. In one embodiment, a fixed token facility may be a chip affixed to the motherboard of the computer system and in communication with the CPU, as will be discussed further below.

In one embodiment, the generation of a secret may be accomplished using a seal operation that encrypts both the root key and the registered identity of the secure pre-boot environment, using a key accessible only to the fixed token. This encrypted data ("key blob") may then be stored in mass storage (e.g., a hard drive of the computer system). When the secure pre-boot environment is launched, for example during a subsequent platform boot, the key blob may be returned to the fixed token, which decrypts it and compares it to the identity registered for the current secure pre-boot environment. If the current secure pre-boot environment identity matches the identity embedded in the key blob, then the root key is released to the secure pre-boot environment.

In one embodiment, the seal operation allows software to explicitly state the future "trusted" configuration that the platform must be in for the secret to be revealed. The seal operation also implicitly includes the relevant platform configuration (i.e., platform configuration register (PCR) values) when the seal operation was performed. The seal operation may use a preselected value to bind the blob to an individual TCP.

If the unseal operation succeeds, proof of the platform configuration that was in effect when the seal operation was performed may be returned to the caller, as well as the secret data.

In certain embodiments, the secure pre-boot environment may also allow for a scale-out design where additional security capabilities and support can be provided via loadable drivers. In one embodiment, the drivers may be EFI runtime drivers. These drivers may include, but are not limited to, secure storage interfaces and drivers for secure code execution. Such drivers may provide user-authentication, remote image integrity challengers, and attested boot, all within a hardened environment.

In one embodiment, the secure pre-boot environment may secure the system management base address (SMBASE) so that no other pre-boot component can perform the SENTER and thus have visibility into the system management random access memory (SMRAM).

Thus, in such an embodiment, the secure pre-boot environment may receive any SMI activations after launch. By the early launch of secure pre-boot environment, the ability of rogue software performing a SENTER and having the ability to see into SMRAM is reduced because of the associated system management mode memory (SMMEM) activation.

In various embodiments, the secure pre-boot environment may have several unload options. For an EFI-aware OS boot, the secure pre-boot environment may tear-down the secure environment. Alternately, the secure pre-boot environment may stay in place until some later "unload" service is invoked.

For example, the secure pre-boot environment may provide a managed hand-off to an OS SVMM. This presents an opportunity to establish a root of trust from pre-boot that may be transferred unbroken to the operating system, providing additional assurance about the stability of the platform beyond that which the OS can derive from loading its own SVMM upon boot up, and greater assurance on the origin of platform SMM code that will persist into the operating system runtime under the control of an OS SVMM.

In various embodiments, the present invention may provide a secure operating environment for code in the pre-boot space. Such an environment offers opportunities to change the way operations that are critical to platform integrity are handled, expanding the platform design envelope and improving user experience.

For example, in the secure pre-boot environment, a flash memory update may be performed without forcing an "init" command, since write access to the flash memory may be opened by trusted code running inside the secure pre-boot environment. Specifically, memory-management unit operations that provide for security, which may include but are not limited to page-level protections, may be established by an SVMM in order to qualify access to the flash-region only to trusted parties. These parties may include but are not limited to the platform-owner update code.

In another embodiment, a flash memory update may be performed by a trusted OS in a boot environment. In such an embodiment, the CPU while in the secure pre-boot environment may protect the flash memory region via page level protection mechanisms. When a transitive hand off occurs from the secure pre-boot environment, the same protected memory regions may be provided to the OS. Thus while in a boot environment, the protected memory (i.e., flash memory) may be accessed and updated accordingly.

In certain embodiments the SVMM may be used during Operating System (OS) runtime, to run alongside the operating system's SVMM. The BIOS SVMM may provide behavior that is platform-specific, such as Reliability-Availability-Serviceability (RAS). These may include handling particular platform errors, such as writing to a physical page of memory that has an Error-Correcting Code (ECC) Single-Bit Error (SBE). An SBE that is detected by the chipset often needs to access a region of memory to read and subsequently write back in order to update the syndrome bits. There is not a standardized way to alert an operating system of this failure and necessary behavior, and during the secure operating system runtime, the OS controls all memory. As such, a peer BIOS SVMM to the OS SVMM provides for platform-specific activities that were formerly done in System Management Mode (SMM); SMM had full access to the system prior to the advent of secure operating systems.

Also, today there is a tacit trust assertion made by operating systems with respect to the platform. For example, BIOS creates tables describing non-enumerable resources, such as the entire memory map, fixed ports, address of the local APIC (Advanced Programmable Interrupt Controller), interrupt routing, and other resources. These tables are only protected by simple checksums. For trusted platforms though, these tables, which are stored in plain memory today, could represent an attack point. The attacker could permute the value describing the platform and lie to the operating system; this attack could include hiding memory, spoofing ports, and the like. A pre-boot environment may be used to generate these tables, sign the contents, transitively hand-off to an OS SVMM with a trust assertion, and the like.

Embodiments may be implemented in a computer program. As such, these embodiments may be stored on a storage medium having stored thereon instructions which can be used to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device. A programmable control device may be a computer processor or a custom designed state machine. Custom designed state machines may be embodied in a hardware device such as a printed circuit board having discrete logic, integrated circuits, or specially designed application specific integrated circuits (ASICs).

Figure 4:
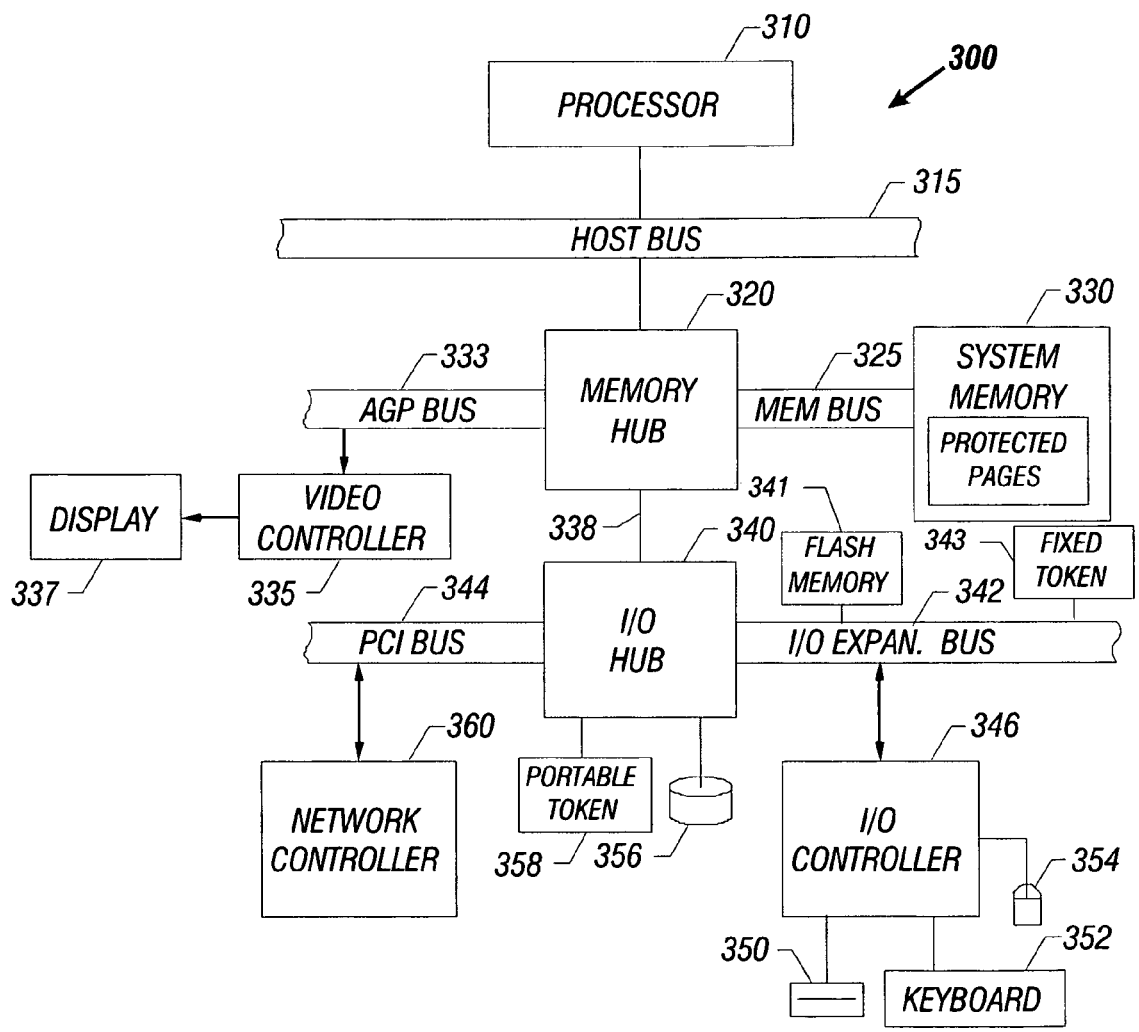
FIG. 4 is a block diagram of a system in accordance with one embodiment of the present invention.

Example embodiments may be implemented in software for execution by a suitable data processing system configured with a suitable combination of hardware devices. FIG. 4 is a block diagram of a representative data processing system, namely computer system 300 with which embodiments of the invention may be used.

Now referring to FIG. 4, in one embodiment, computer system 300 includes a processor 310, which may include a general-purpose or special-purpose processor such as a microprocessor, microcontroller, ASIC, a programmable gate array (PGA), and the like.

The processor 310 may be coupled over a host bus 315 to a memory hub 320 in one embodiment, which may be coupled to a system memory 330 via a memory bus 325. As shown in FIG. 4, in certain embodiments, system memory 330 may have protected memory pages. Such pages may include, for example, pages related to the SVMM and other trusted virtual machines, among others. In certain embodiments, memory hub 320 may be configured to block access to at least certain portions of the protected memory pages of system memory 330. The memory hub 320 may also be coupled over an Advanced Graphics Port (AGP) bus 333 to a video controller 335, which may be coupled to a display 337. The AGP bus 333 may conform to the Accelerated Graphics Port Interface Specification, Revision 2.0, published May 4, 1998, by Intel Corporation, Santa Clara, Calif.

The memory hub 320 may also be coupled (via a hub link 338) to an input/output (I/O) hub 340 that is coupled to a input/output (I/O) expansion bus 342 and a Peripheral Component Interconnect (PCI) bus 344, as defined by the PCI Local Bus Specification, Production Version, Revision 2.1 dated in June 1995. The I/O expansion bus 342 may be coupled to an I/O controller 346 that controls access to one or more I/O devices. As shown in FIG. 4, these devices may include in one embodiment storage devices, such as a floppy disk drive 350 and input devices, such as keyboard 352 and mouse 354. Also coupled to the I/O expansion bus 242 may be a flash memory 341 which, in one embodiment, may persistently store the secure code for the pre-boot environment. The I/O hub 340 may also be coupled to, for example, a hard disk drive 356 as shown in FIG. 4. It is to be understood that other storage media may also be included in the system.

Also coupled to I/O expansion bus 342 may be a fixed token 343. In one embodiment, fixed token 343 may be permanently bonded to a motherboard of computer system 300. Fixed token 343, which may be a general purpose processor, ASIC, or the like, may have basic so-called "smart card" capabilities. In certain embodiments, these capabilities may include cryptographic abilities such as keys, storage, signing, and encryption. In various embodiments, fixed token 343 may be used for attestation and sealing/unsealing of secrets. Such attestation may include attesting to platform compliance and specific monitor/applets loaded. In sealing secrets, fixed token 343 may be programmed to seal/unseal secrets to the same environment or a selected environment.

In certain embodiments, a portable token 358 may be coupled to I/O hub 340. It is to be understood that such coupling may be by any standard connection such as a universal serial bus (USB), for example. In one embodiment, portable token 358 may have capabilities similar to fixed token 343. For example, portable token 358 may be used to test the system for a user, provide for portable user secrets, provide anonymous identifications, and the like.

In an alternate embodiment, the I/O controller 346 may be integrated into the I/O hub 340, as may other control functions. The PCI bus 344 may also be coupled to various components including, for example, a network controller 360 that is coupled to a network port (not shown).

Additional devices may be coupled to the I/O expansion bus 342 and the PCI bus 344, such as an input/output control circuit coupled to a parallel port, serial port, a non-volatile memory, and the like.

Although the description makes reference to specific components of the system 300, it is contemplated that numerous modifications and variations of the described and illustrated embodiments may be possible. For example, instead of memory and I/O hubs, a host bridge controller and system bridge controller may provide equivalent functions. In addition, any of a number of bus protocols may be implemented.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   establishing a secure pre-boot environment in a computer system;
   preventing untrusted drivers from being loaded during the secure pre-boot environment; and
   launching a secure virtual machine monitor in the secure pre-boot environment.

2. The method of claim 1, further comprising storing a secret in the secure pre-boot environment.

3. The method of claim 1, further comprising transitioning the computer system from the secure pre-boot environment to an operating system environment.

4. The method of claim 1, further comprising updating a flash memory in the secure pre-boot environment.

5. The method of claim 1, further comprising issuing a system management command in the secure pre-boot environment.

6. The method of claim 1, further comprising receiving system management interrupts in the secure pre-boot environment.

7. The method of claim 2, further comprising generating the secret in the form of a root key sealed via a fixed token.

8. The method of claim 7, further comprising releasing the root key to the computer system only while in the secure pre-boot environment.

9. The method of claim 1, further comprising isolating harmful code from verifiable code.

10. A method comprising:
    providing firmware control of a computer system in a pre-boot environment;
    creating a secure environment in the pre-boot environment;
    preventing untrusted drivers from being loaded during the secure environment; and
    launching a secure virtual machine monitor in the secure pre-boot environment.

11. The method of claim 10, further comprising entering a boot environment from the pre-boot environment.

12. The method of claim 11, further comprising maintaining the secure environment in a background of the boot environment.

13. The method of claim 11, further comprising tearing down the secure environment if the boot environment is a trusted boot environment.

14. The method of claim 10, further comprising storing a secret in the pre-boot environment.

15. The method of claim 14, further comprising using a fixed token to store the secret.

16. The method of claim 14, further comprising accessing the secret while in a different entry of the secure environment in the pre-boot environment.

17. The method of claim 12, further comprising using the secure environment to perform functions of reliability, availability, and serviceability.

18. The method of claim 11, further comprising generating tables in the pre-boot environment and providing the tables to the boot environment with a trust assertion.

19. A system comprising:
   at least one storage device containing instructions that if executed enable the system to:
      establish a secure pre-boot environment in a computer system;
      prevent untrusted drivers from being loaded during the secure pre-boot environment; and
      launch a secure virtual machine monitor in the secure pre-boot environment; and
   a processor coupled to the at least one storage device to execute the instructions.

20. The system of claim 19, further comprising instructions that if executed enable the system to store a secret in the secure pre-boot environment.

21. The system of claim 19, further comprising a flash memory containing secure Basic Input/Output System code.

22. The system of claim 19, further comprising a fixed token coupled to the processor.

23. The system of claim 22, wherein the fixed token comprises at least one root key for secret security.

\* \* \* \* \*